(No Model.) 2 Sheets—Sheet 1.

A. WILBUR.
FILTER.

No. 399,957. Patented Mar. 19, 1889.

Attest
F. L. Middleton
C. L. Sturtevant

Inventor.
Alfred Wilbur.
by Ellis Spear

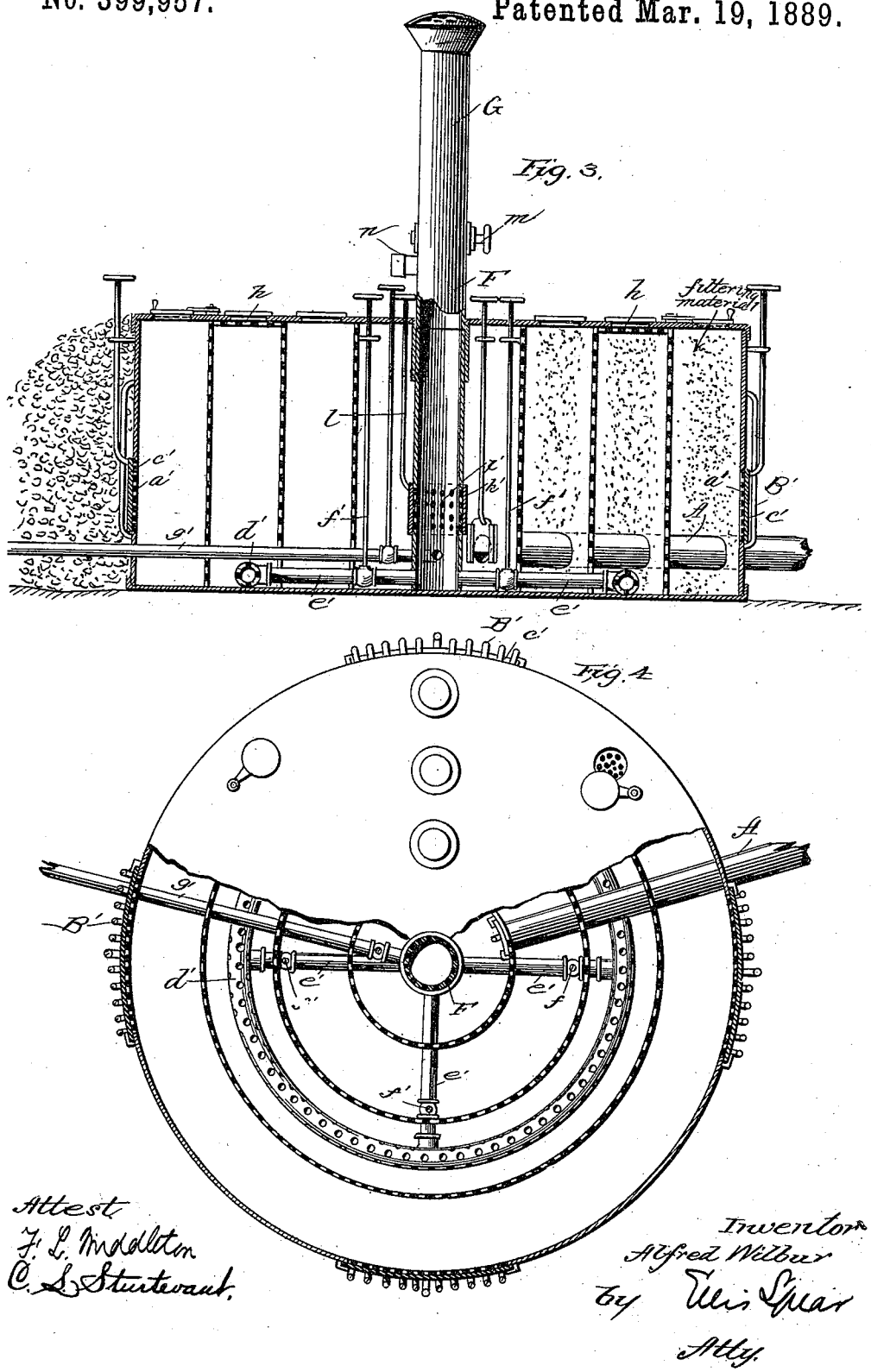

UNITED STATES PATENT OFFICE.

ALFRED WILBUR, OF ALLEGHENY, ASSIGNOR OF ONE-HALF TO BENJ. H. LIGHTFOOT, OF PITTSBURG, PENNSYLVANIA.

FILTER.

SPECIFICATION forming part of Letters Patent No. 399,957, dated March 19, 1889.

Application filed March 19, 1888. Serial No. 267,604. (No model.)

*To all whom it may concern:*

Be it known that I, ALFRED WILBUR, of Allegheny, in the county of Allegheny and State of Pennsylvania, have invented a new and useful Improvement in Filters; and I do hereby declare that the following is a full, clear, and exact description of the same.

The invention hereinafter described is an improvement in filters adapted for use in filtering water either where the source of supply is taken from a lake or pond or like bodies of still water, or from rivers or other running streams containing impurities from cities bordering on their banks or from other causes. Where the filter is particularly adapted for use in ponds, lakes, and other sources of comparatively still water, where there is little accumulation of foreign matter other than that natural to large bodies of water, the filter requires but little cleansing; but when the water of rivers and like bodies of water containing such foreign matter are filtered it is necessary to provide a filter which shall not only purify the water passing through it, but also provide means for flushing and cleansing the filter at intervals.

Figure 1:
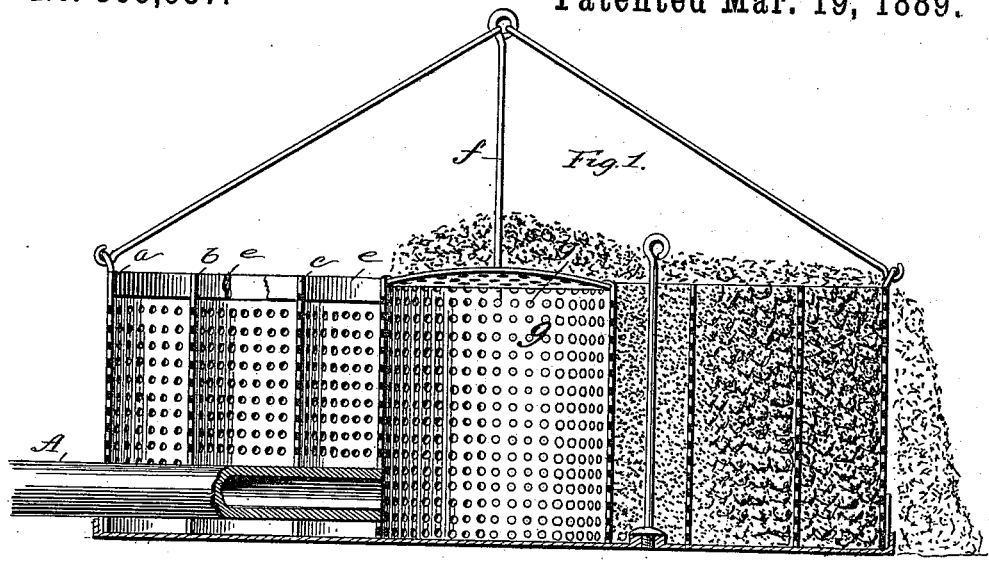
Figure 2:
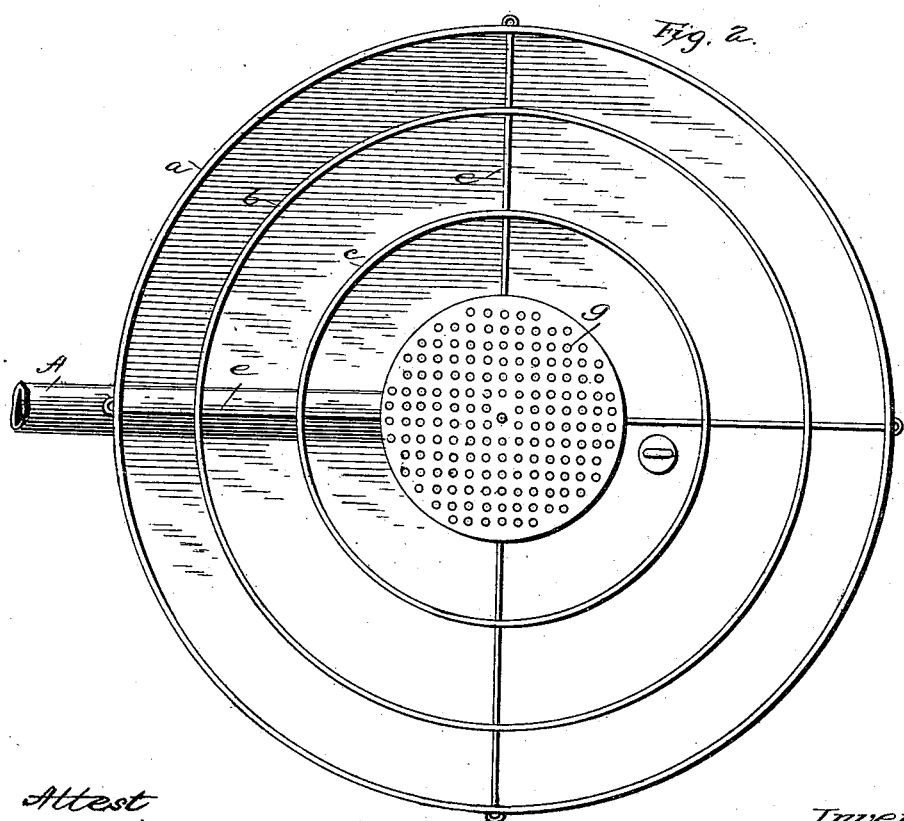

In the accompanying drawings, Figure 1 is a vertical section of my improved filter as arranged for still water, such as a pond or lake. Fig. 2 is a plan of the same. Fig. 3 is a sectional view of the filter with the flushing apparatus in place. Fig. 4 is a plan view of the same, partly in section.

In the drawings, A represents the receiving-pipe, which may be in communication with any suitable reservoir or source of supply or point of consumption, and if the relative position of the source of supply and the points of consumption are such as to require a pump then a suitable pump is also in connection with the said pipes. This pipe is preferably made as a section of the main pipe and may be hinged to it by ball or socket joint or other connection, so that it may be lowered to the proper depth within the body of water from which the supply is to be taken. In lowering the filter and pipes in position I prefer to use the pipe-laying apparatus which is the subject of Letters Patent of the United States, No. 375,404, dated December 27, 1887, as this apparatus is particularly adapted for the purpose. Upon the end of this pipe I arrange my improved filter, and the weight of said filter not only tends to sink the pipe to the bottom, but also keeps it accurately in proper position.

My filter, as shown, is composed of a series of concentric rings of a suitable depth, one being placed within the other, each one being smaller in circumference, leaving a space between them, as shown. These rings are shown as three in number; but of course this number may be increased or diminished, but with an increased or diminished effect. I have indicated them at *a b c*. They are suitably braced by means of stay-rods extending between them, as shown at *e;* and in order to provide means for lowering the whole into the water I have arranged a central post, *f*, which is in connection with guide-rods, with points on the outer periphery of the ring *a*. By this means a derrick or crane may be connected with the filter to lower the same.

In the center of the space inclosed by the ring *c*, I form a chamber, *g*, having a closed top, and the discharge-pipe A passes through the rings *a b c* and communicates with this inner chamber. The rings *a b c* and the walls and top of the inner chamber are wholly or partly composed of perforated material, so that water may pass through freely.

In the spaces between the rings I place suitable filtering material, so that as the water passes through it is entirely purified and cleansed, and as it reaches the inner chamber the water is drawn off by the action of the pump through the discharge pipe or pipes. A suitable valve is placed at one or more points in the bottom of the filter, so that when it is desired to elevate the filter for repair the water may be allowed to flow out as the filter rises. When the filter is put in place, I anchor it firmly, and at the same time add to its properties as a filter by banking around and above it an outer covering of sand and gravel or other filtering material, which thus acts as a natural filter, and to a great extent purifies the water before it reaches the filter proper.

At intervals in the outer wall I arrange openings, as shown in Figs. 3 and 4, covered by screens $a'$, and protected by grate-bars $B'$ upon the outside, which prevent the screens from becoming injured by contact with large bodies. Gates $c'$, provided with suitable handles fitted to guides, are adapted to close over the screens to prevent the admission of water through the same when desired.

It will thus be observed that the water, before reaching the mouth of the conveyer-pipe, must first pass through the outer bank of gravel or sand, which relieves it of all impurities of any size, then through the gates of the outer wall, and then through the perforated cylinders and the filtering material between them to the inner chamber, from which point it is pumped away to the reservoir or point of consumption by means of a suitable pump.

In order to provide for the cleaning of the filter when it becomes foul, I arrange flushing means, which I shall now proceed to describe. In the bottom of the filtering-spaces I arrange a circular pipe, $d'$, having perforations upon its upper side, and from this ring a series of pipes, $e'$, extend to the interior of the central chamber, communicating with a stand-pipe, F, which occupies the center of the central chamber. Each of these pipes $e'$ is provided with a valve and operating-rod therefor, $f'$. From the stand-pipe a pipe, $g'$, extends through the cylinders and outer wall of the filter, being carried out, preferably, alongside of the conveyer-pipe; but in the drawings it is shown, for convenience, as extending in the opposite direction and connected at any suitable point with a flushing-reservoir or a forcing-pump. When it is desired to flush the filter, the outer gates are closed and a stream is turned on through the pipe $g'$, the water passing into the stand-pipe and through the pipes $e'$ to the annular perforated pipe between the cylinders, the water rising through the filtering material and carrying off all the foul matter which has accumulated. In order to prevent the filtering material from being carried off with the flushing of the filling-spaces between the cylinders, I provide a ring of perforated material, as shown at $h$, and this is placed on top of the filling and weighted down by stones or other weights, and when the filter is flushed the water passes up through the material, and the perforated ring prevents the filtering material from being carried off with the flushing-stream. With this form of filter, made for use, as described, in river and like streams, I provide a suitable cover, and in this cover perforations are made, through which the accumulated dirt and water may pass off.

I form the stand-pipe, for a portion of its length, near the bottom, within the central chamber, of perforated material, as shown at $i'$, and cover this by a sleeve, $k'$, which is adapted to be moved up to uncover or moved down to cover the perforations through an operating-rod, $l$. When the outer chambers of the filter have been flushed and purified, I close the valves in the pipes $e'$ and elevate the sleeve $k'$ to uncover the perforated section of the stand-pipe, and this allows the water to flow out through the perforations into the inner chamber, which will thus thoroughly cleanse it from all impurities and carry them off through the openings in the cover.

I have also provided means for showering the outer bank of gravel or sand surrounding the filter, and for this purpose provide the stand-pipe with an extension, G, surmounted by a rose. When the rest of the filter has been cleansed, I lower the sleeve $k$ (the valves to the ring-pipe having been closed) and send the full force of water up the stand-pipe, which discharges at the rose-head and sends a shower which flows outwardly, striking the bank of gravel or sand, washing off the impurities which cover the surface thereof. A suitable valve is placed within the stand-pipe at $m$, so that the supply to the rose may be regulated.

In order to render the purification of the filter absolute, I make a connection at the point $n$ upon the stand-pipe with another pipe which leads to a supply of steam, by which I am enabled to flush the chambers, as described, by means of hot water, which effectually destroys all germs. Suitable man-holes are made in the cover, opening into each compartment, through which access may be gained to the interior.

It will be understood that the ring distributing-pipes may be provided in every filtering-space, if desired or found necessary.

I claim as my invention—

1. A filter consisting of a central chamber, a series of filtering-chambers surrounding the same, a conveyer-pipe communicating with the central chamber, a flushing pipe or pipes also connected with said chamber, a series of pipes communicating with said flushing-pipe and extending to one or more of the outer filtering-chambers, and a perforated ring connecting said pipes, substantially as described.

2. A filter consisting of an inner chamber, filtering-chambers surrounding the same, a perforated ring in the bottom of one of the filtering-chambers, pipes connecting said ring with the inner chamber, valves in said pipes, and a flushing pipe or pipes in communication with said connecting-pipes for supplying the ring or rings with water, and a conveyer-pipe, substantially as described.

3. A filter consisting of the central chamber, a series of concentric cylinders surrounding the same, with filtering material between their walls, said cylinders being made perforated, a stand-pipe within the central chamber, a flushing-pipe in connection therewith, distributing-pipes leading from said stand-pipe to the filtering chamber or chambers, and a perforated delivery-pipe connecting therewith, substantially as described.

4. A filter consisting of a central chamber, a series of concentric chambers outside the same containing filtering material, a stand-pipe within the inner chamber, a flushing-pipe in connection therewith, distributing-pipes leading therefrom, and a valved passage between the stand-pipe and the inner chamber for flushing the same, substantially as described.

5. A filter consisting of a central chamber, a series of concentric chambers outside the same containing filtering material, a stand-pipe within the inner chamber, a flushing-pipe in connection therewith, distributing-pipes leading therefrom, and a sliding sleeve upon said stand-pipe adapted to cut off communication between said stand-pipe and the interior chamber, substantially as described.

6. A filter consisting of a central chamber, a series of concentric chambers outside the same containing filtering material, a stand-pipe within the inner chamber, a flushing-pipe in connection therewith, distributing-pipes leading therefrom, suitable valves in said pipes, and an extension for said stand-pipe having a rose on its upper end adapted to spread the water, substantially as described.

7. A filter consisting of a central chamber, a series of concentric chambers outside the same containing filtering material, a stand-pipe within the inner chamber, a flushing-pipe in connection therewith, distributing-pipes leading therefrom, and an extension for said stand-pipe having a pipe secured thereto adapted to be connected with a source of steam-supply, substantially as described.

8. In the described filter, the combination of the following elements: a central chamber, a series of concentric chambers outside the same containing filtering material, gates in the wall of the outer chamber for the admission of water, a conveyer-pipe provided with a suitable valve extending from the inner chamber to the outside of the filter, a stand-pipe within the central chamber having an extension surmounted by a rose, a flushing-pipe leading from the outside to the stand-pipe, an annular perforated pipe in one of said chambers, distributing-pipes leading from the stand-pipe to said perforated pipe, whereby water forced from the outside through the flushing-pipe will, through the annular perforated pipe, cleanse the filtering material, and a cover for said filter for preventing the escape of the filtering material or other material, substantially as described.

9. A filter consisting of a series of concentric chambers containing filtering material, a conveyer-pipe, and a flushing-pipe with branches to the concentric chambers, and a perforated ring for covering the concentric chamber or chambers, whereby the filtering material is prevented from washing off in the flushing operation, substantially as described.

In testimony whereof I have signed my name to this specification in the presence of two subscribing witnesses.

ALFRED WILBUR.

Witnesses:
A. G. HATRY,
F. A. DICKSON.